United States Patent
Maiello

(10) Patent No.: US 7,258,078 B1
(45) Date of Patent: Aug. 21, 2007

(54) ANIMAL TAIL OR LIMB GROOMING BRUSH

(76) Inventor: Michael Maiello, 4939 Juanita Way S., St. Petersburg, FL (US) 33705

( * ) Notice: Subject to any disclaimer, the term of this patent is extended or adjusted under 35 U.S.C. 154(b) by 28 days.

(21) Appl. No.: 10/984,142

(22) Filed: Nov. 9, 2004

(51) Int. Cl.
  A01K 13/00 (2006.01)
  A46B 9/04 (2006.01)

(52) U.S. Cl. .................... 119/619; 15/167.2

(58) Field of Classification Search ........... 119/619, 119/618, 625, 627, 633, 900, 601, 611–615, 119/621, 622; 132/120, 215, 216, 223, 224; 15/166, 167.2, 159.1; D4/127, 128, 132, D4/134; D30/158, 199
See application file for complete search history.

(56) References Cited

U.S. PATENT DOCUMENTS

| | | | | |
|---|---|---|---|---|
| 1,270,137 A | * | 6/1918 | Forde | 15/164 |
| 1,492,660 A | * | 5/1924 | Arkus | 15/167.2 |
| 1,546,322 A | * | 7/1925 | Solary | 15/167.2 |
| 5,022,350 A | * | 6/1991 | Sequist | 119/619 |
| D325,472 S | * | 4/1992 | Premack | D4/128 |
| D403,165 S | * | 12/1998 | Ferrante et al. | D4/128 |
| 2002/0157202 A1 | * | 10/2002 | Hartel | 15/167.2 |

FOREIGN PATENT DOCUMENTS

FR CH 655638 A5 * 5/1988
JP 09168959 * 6/1997

* cited by examiner

*Primary Examiner*—Teri Pham Luu
*Assistant Examiner*—Elizabeth Shaw
(74) *Attorney, Agent, or Firm*—Gerald M. Walsh; Kenneth M. Bush; Bush IP Law Group, LLC

(57) ABSTRACT

A brush for grooming, brushing, cleaning, fluffing, and combing the tail, limb, or paw of an animal. The grooming brush has a pair of opposing semi-circular brushes on a scissors-like hand operated device. The semicircular brushes are placed around the base of the tail, limb, or paw of an animal and closed together with the scissors-like device to form a circular brush around the tail, limb, or paw. The brush is then moved to the extremity of the tail, limb, or paw to fluff, brush, clean, groom, and comb the hair.

3 Claims, 1 Drawing Sheet

ANIMAL TAIL OR LIMB GROOMING BRUSH

BACKGROUND OF THE INVENTION

1. Field of the Invention

The present invention is in the field of grooming brushes for animals and, more particularly, circular brushes for cleaning, combing, brushing, and fluffing the hair of the tail and paws.

2. Technical Background

Grooming brushes for animals are known, but these are designed for grooming or brushing coats of animals, and are not adequate for grooming or fluffing the hair on the tail, limbs or paws of the animal. Standard grooming brushes do not produce a uniform or even effect on the hair of the tail or paws. These brushes leave some portion of the hair matted and other portions erect. What is needed is a grooming brush that cleans away dirt, dust, and sand, and that combs and fluffs, producing a uniform fluffing of the hair on the tail and paws without the need of a complex brushing system or method.

SUMMARY OF THE INVENTION

The present invention provides a brush and method for brushing, fluffing, cleaning, and grooming the tail or paws of an animal. The brush has two arms, each having a proximal end and a distal end. The proximal ends each have handles which can be grasped by the fingers of one hand. The brush ends or distal ends each have a semicircular brush. The arms hold the semicircular brushes opposite each other, and are biased to hold the semicircular brushes in an open position. The brush ends or distal ends can be closed by bringing the proximal ends together. Thus, the semicircular brushes form a closed circular brush when the proximal ends are brought together by the action of the fingers moving the handles together. The brush can be placed around the tail or paws when the semicircular brushes are in the open position. The semicircular brushes are then closed around the base of the tail or paw, forming a closed circular brush around the tail or paw. The tail or paw is then brushed by moving the brush from the base to the extremity of tail or paw. The tail or paw then slip out of the brush to ensure maximum coverage of the extremities. The brush is then opened with the fingers, and the process is repeated as desired.

An advantage of the present invention is a brush that will make an animal's tail twice as fluffy with just a few strokes.

Another advantage is a brush or comb that removes dust, dirt, and sand as it brushes, grooms, combs, and fluffs.

Another advantage is a brush that will make an animal look more attractive with a beautifully fluffed up tail.

Another advantage is a brush that is simple and easy to use.

Another advantage is a brush that is simple and inexpensive to construct.

DETAILED DESCRIPTION OF THE INVENTION

Figure 1:
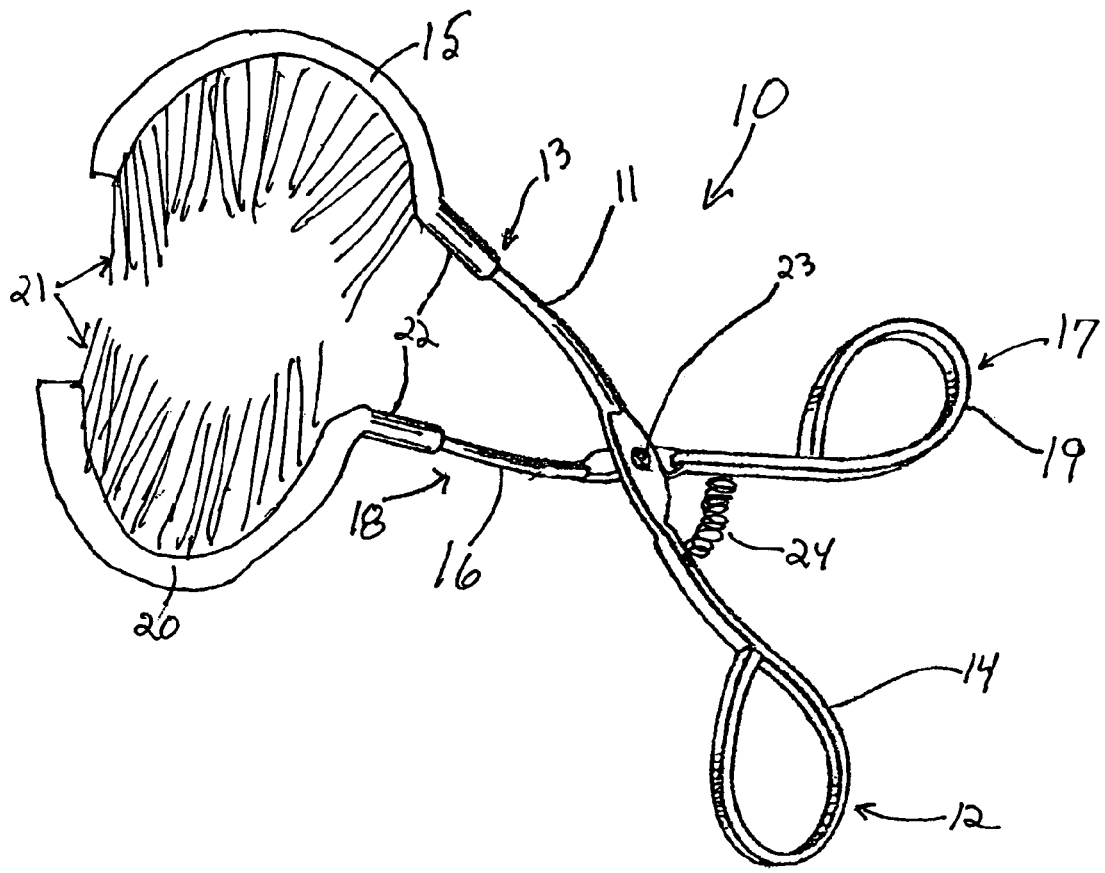
FIG. 1 shows a preferred embodiment of the grooming brush of the present invention.

While the following description details the preferred embodiments of the present invention, it is to be understood that the invention is not limited in its application to the details of construction and arrangement of the parts illustrated in the accompanying drawings, since the invention is capable of other embodiments and of being practiced in various ways.

FIG. 1 shows a diagram of a preferred embodiment of the present invention. Grooming brush 10 has a first arm 11 with proximal end 12 and distal end 13. Proximal end 12 has a handle 14 and distal end 13 has a brush base 15. Brush base 15 is, preferably, semicircular in shape, and is attached permanently or reversibly to distal end 13 by a connector 22. Grooming brush 10 has a second arm 16 with proximal end 17 and distal end 18. Proximal end 17 has a handle 19 and distal end 18 has a brush base 20. Brush base 20 is, preferably, semicircular in shape, and is attached permanently or reversibly to distal end 18 by a connector 22. Brush bases 15 and 20 have bristles 21 made of any suitable material known in the art of grooming brushes. Brush bases 15 and 20 may vary somewhat from semicircular to accommodate paws, or bristles 21 may be varied in length.

First arm 11 and second arm 16 are connected by a pivot 23 to form a scissors-like apparatus. A spring 24 is positioned between first arm 11 and second arm 16 to bias the handles 14, 19 and the brush bases 15, 20 away from each other, forming an open position as shown in FIG. 1. If handles 14 and 19 are pressed towards each other by the action of the fingers of a user, the brush bases 15 and 20 will come together to form a closed circular brush with bristles 21 oriented inward towards the center of the circular brush.

In order to use the grooming brush of the present invention, the brush 10 is opened and placed around the base of the tail or limb. Brush 10 is then closed by bringing the handles 14, 19 together so that brush 10 completely encircles the base of the tail or limb. A user can manually apply any desired pressure around the tail or limb. Brush 10 is then drawn along the tail or limb towards its extremity, with the bristles 21 cleaning, brushing, combing, and fluffing the hair on the tail, limb, or paw. The brush 10 can be opened by releasing the handles 14, 19, and the process is repeated as often as desired to fluff the limb or tail of an animal.

The present invention may also be constructed as a "circular comb" instead of a circular brush. Bristles 21 may be replaced with teeth that are typically found in combs for the purpose of combing hair. The circular comb embodiment would have a pair of semicircular bases having teeth instead of bristles. The bases would form the circular comb when placed together around the tail or limb of an animal as described above. The circular comb would operate similar to circular brush 10 as described above, but its application would be limited to combing.

The present invention may also be used on any cylindrical object to brush the surface of the cylindrical object or to apply a substance to its surface. The brush would be used by moving it back and forth along the length of the cylindrical object. For example, the circular brush 10 may be used by placing it around a pole as described above to clean or scrape the pole, the bases 15 and 20 having bristles suited for this particular purpose. In addition, the circular brush 10 may be used by placing it around a pole to apply a cleaning material or paint and the like, the bases 15 and 20 having bristles suited for this particular purpose.

In an alternate embodiment, the present invention may be constructed so that bases 15 and 20 are brought together to form a circular brush when the handles are brought apart. In this case, arms 11 and 16 are biased to maintain bases 15 and 20 in a closed position when handles 14 and 19 are not brought together. The remaining elements of the brush or comb would be as described above.

The foregoing description has been limited to specific embodiments of this invention. It will be apparent, however, that variations and modifications may be made by those skilled in the art to the disclosed embodiments of the invention, with the attainment of some or all of its advantages and without departing from the spirit and scope of the present invention. For example, brush 10 may be operated manually without handles, with the two semicircular brushes 15, 20 being placed around the base of the tail or limb with the hands, and moved down the tail or limb to its extremity with the hands to fluff up the hair.

It will be understood that various changes in the details, materials, and arrangements of the parts which have been described and illustrated above in order to explain the nature of this invention may be made by those skilled in the art without departing from the principle and scope of the invention as recited in the following claims.

The invention claimed is:

1. A method of fluffing the hair on an animal's tail or limb or paw, comprising the steps of:
    a) providing a pair of semicircular brushes;
    b) placing said semicircular brushes around an animal's tail or limb or paw thereby forming a closed circular brush; and
    c) moving said circular brush only towards the extremity of said tail or limb or paw.

2. The method of claim 1 wherein the step of placing said semicircular brushes around an animal's tail or limb or paw is performed using a brush comprising a pair of bases each forming a semicircle; said bases each having bristles oriented towards the center of said semicircle; said bases forming a circular brush when placed together around the tail or limb of an animal; and said bases attached to arms having handles.

3. The method of claim 1 wherein the step of placing said semicircular brushes around an animal's tail or limb or paw is performed using a brush comprising a hand operated device having two arms, each arm having a proximal end and distal end; said proximal ends having handles; said distal ends having semicircular brushes; said arms maintaining said semicircular brushes opposite each other; and said semi-circular brushes forming a closed circular brush when said distal ends are brought together by moving said handles together.

* * * * *